(12) United States Patent
Ding et al.

(10) Patent No.: US 10,745,964 B2
(45) Date of Patent: *Aug. 18, 2020

(54) COATED ARTICLE WITH IR REFLECTING LAYER(S) AND OVERCOAT FOR IMPROVING SOLAR GAIN AND VISIBLE TRANSMISSION

(71) Applicant: Guardian Glass, LLC, Auburn Hills, MI (US)

(72) Inventors: Guowen Ding, Auburn Hills, MI (US); Daniel Schweigert, Auburn Hills, MI (US); Minh Lee, Auburn Hills, MI (US); Brent Boyce, Novi, MI (US)

(73) Assignee: GUARDIAN GLASS, LLC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/374,936

(22) Filed: Apr. 4, 2019

(65) Prior Publication Data

US 2019/0323287 A1 Oct. 24, 2019

Related U.S. Application Data

(63) Continuation of application No. 15/448,629, filed on Mar. 3, 2017, now Pat. No. 10,253,560.

(51) Int. Cl.
 *B32B 15/04* (2006.01)
 *B32B 17/06* (2006.01)
 (Continued)

(52) U.S. Cl.
 CPC ............... *E06B 9/24* (2013.01); *C03C 17/36* (2013.01); *C03C 17/366* (2013.01);
 (Continued)

(58) Field of Classification Search
 USPC .................... 428/426, 428, 432, 434, 688
 See application file for complete search history.

(56) References Cited

U.S. PATENT DOCUMENTS

| 4,883,721 A | 11/1989 | Nalepka et al. |
| 5,344,718 A | 9/1994 | Hartig et al. |
| (Continued) | | |

FOREIGN PATENT DOCUMENTS

| EP | 2 746 236 | 6/2014 |
| WO | WO 03/055816 | 7/2003 |
| WO | WO 2012/127162 | 9/2012 |

OTHER PUBLICATIONS

U.S. Appl. No. 15/448,629, filed Mar. 3, 2017; Ding et al.
U.S. Appl. No. 15/448,739, filed Mar. 3, 2017; Zhang et al.
U.S. Appl. No. 15/448,620, filed Mar. 3, 2017; Saraf et al.

*Primary Examiner* — Lauren R Colgan

(57) ABSTRACT

A coated article includes a low-emissivity (low-E) coating. The low-E coating includes at least one infrared (IR) reflecting layer of a material such as silver, gold, or the like, and a dielectric overcoat designed to increase solar heat gain coefficient (SHGC) of the coated article. A dielectric undercoat may also be designed to increase SHGC of the coated article in certain example embodiments. In certain example embodiments, the overcoat and/or undercoat are designed to increase SHGC while also providing for desirably high visible transmission (TY or $T_{vis}$) and desirably low normal emittance ($E_n$).

9 Claims, 5 Drawing Sheets

(51) Int. Cl.
  *E06B 9/24* (2006.01)
  *C03C 17/36* (2006.01)
  *G02B 1/14* (2015.01)
  *E06B 3/67* (2006.01)
  *G02B 5/20* (2006.01)
  *G02B 5/26* (2006.01)

(52) U.S. Cl.
  CPC ...... *C03C 17/3618* (2013.01); *C03C 17/3642* (2013.01); *C03C 17/3644* (2013.01); *C03C 17/3681* (2013.01); *E06B 3/6715* (2013.01); *G02B 1/14* (2015.01); *G02B 5/208* (2013.01); *G02B 5/26* (2013.01); *C03C 2217/216* (2013.01); *C03C 2217/281* (2013.01); *C03C 2217/73* (2013.01); *C03C 2217/734* (2013.01); *E06B 2009/2417* (2013.01)

(56) References Cited

U.S. PATENT DOCUMENTS

| | | | |
|---|---|---|---|
| 5,837,361 A | 11/1998 | Glaser et al. | |
| 5,952,084 A * | 9/1999 | Anderson | C03C 17/22 359/359 |
| 5,965,246 A * | 10/1999 | Guiselin | C03C 17/3423 359/580 |
| 6,210,784 B1 | 4/2001 | Rondeau et al. | |
| 6,306,525 B1 | 10/2001 | Schicht | |
| 6,355,334 B1 | 3/2002 | Rondeau et al. | |
| 6,576,349 B2 | 6/2003 | Lingle et al. | |
| 6,602,608 B2 | 8/2003 | Stachowiak | |
| 6,610,410 B2 | 8/2003 | Ebisawa et al. | |
| 6,830,817 B2 * | 12/2004 | Stachowiak | C03C 17/36 428/426 |
| 7,005,188 B2 | 2/2006 | Anderson et al. | |
| 7,153,579 B2 | 12/2006 | Kriltz et al. | |
| 7,241,506 B2 | 7/2007 | Hartig | |
| 7,390,572 B2 | 6/2008 | Butz et al. | |
| 8,945,714 B2 | 2/2015 | Lao et al. | |
| 9,028,956 B2 | 5/2015 | Knoll et al. | |
| 9,028,983 B2 | 5/2015 | Imran et al. | |
| 9,052,456 B2 | 6/2015 | Hassan et al. | |
| 9,199,874 B2 | 12/2015 | Peter et al. | |
| 9,212,417 B2 | 12/2015 | Frank et al. | |
| 9,297,197 B2 | 3/2016 | Lao et al. | |
| 9,315,414 B2 | 4/2016 | Hassan et al. | |
| 9,365,450 B2 | 6/2016 | Ding et al. | |
| 9,371,684 B2 | 6/2016 | Butz et al. | |
| 9,403,345 B2 | 8/2016 | Lao et al. | |
| 9,410,359 B2 | 8/2016 | Ding et al. | |
| 9,494,717 B2 | 11/2016 | Reymond et al. | |
| 9,499,437 B2 | 11/2016 | Imran et al. | |
| 9,518,319 B2 | 12/2016 | Ding et al. | |
| 9,556,070 B2 | 1/2017 | Wuillaume et al. | |
| 10,253,560 B2 | 4/2019 | Ding et al. | |
| 2007/0281171 A1 * | 12/2007 | Coster | B32B 17/10036 428/432 |
| 2009/0047509 A1 * | 2/2009 | Gagliardi | C03C 17/36 428/336 |
| 2009/0186213 A1 | 7/2009 | Ihlo | |
| 2009/0324967 A1 * | 12/2009 | Disteldorf | C03C 17/36 428/428 |
| 2013/0015677 A1 * | 1/2013 | Benito Gutierrez | C03C 17/36 296/84.1 |
| 2015/0345206 A1 * | 12/2015 | Vikor | A01M 29/08 428/34 |
| 2016/0299259 A1 * | 10/2016 | You | C09D 7/20 |
| 2018/0252027 A1 | 9/2018 | Ding | |

* cited by examiner

COATED ARTICLE WITH IR REFLECTING LAYER(S) AND OVERCOAT FOR IMPROVING SOLAR GAIN AND VISIBLE TRANSMISSION

This application relates to a coated article having a low-emissivity (low-E) coating that includes at least one infrared (IR) reflecting layer of a material such as silver, gold, or the like, and a dielectric overcoat designed to increase solar heat gain coefficient (SHGC) of the coated article. A dielectric undercoat may also be designed to increase SHGC of the coated article in certain example embodiments. In certain example embodiments, the overcoat and/or undercoat are designed to increase SHGC and visible transmission (TY or $T_{vis}$), and still provide for desirably low normal emittance ($E_n$). It has surprisingly been found that overcoat and/or undercoat designs herein advantageously provide for increased SHGC and/or visible transmission ($T_{vis}$) values of the coated article, and good durability, without significantly reducing normal emissivity ($E_n$).

BACKGROUND AND SUMMARY OF EXAMPLE EMBODIMENTS OF THE INVENTION

Coated articles are known in the art for use in window applications such as insulating glass (IG) window units, vehicle windows, monolithic windows, and/or the like. In certain example instances, designers of coated articles often strive for a combination of high visible transmission, substantially neutral color, low emissivity (or emittance), low sheet resistance ($R_s$), and/or low specific resistivity. High visible transmission and substantially neutral color may permit coated articles to be used in applications where these characteristics are desired such as in architectural or vehicle window applications, whereas low-emissivity (low-E), low sheet resistance, and low specific resistivity characteristics permit such coated articles to block significant amounts of IR radiation so as to reduce for example undesirable heating of vehicle or building interiors.

However, conventional coated articles are often lacking with respect to one or more of: (i) mechanical durability, and/or (ii) ability to realize a combination of good/high visible transmission ($T_{vis}$), high solar heat gain coefficient (SHGC), and low emissivity.

U.S. Pat. No. 6,210,784 in Example 2 discloses a layer stack of glass/TiO/ZnO/Ag/Ti/TiO/SnO/SiO/SiN. However, this coated article is silent as to SHGC and is only able to achieve a visible transmission of 78.6% measured monolithically.

In warm climates, low SHGC values are desired together with high visible transmission. Thus, the prior art typically desires low SHGC values which teaches away from example embodiments of this invention. However, in colder climates high SHGC values are often desired. SF (G-Factor; EN410-673 2011) and SHGC (NFRC-2001) values are calculated from the full spectrum ($T_{vis}$, Rg and Rf) and may be measured with a spectrophotometer such as a Perkin Elmer 1050.

In view of the above, it will be appreciated that there exists a need in the art for a coated article including a coating (e.g., in the context of a monolithic or IG window unit) which has the ability to realize one or more of: (i) good durability, (ii) high SHGC, (iii) high $T_{vis}$, and/or (iv) low normal emissivity ($E_n$).

Certain example embodiments of this invention relate to a coated article having a low-emissivity (low-E) coating that includes at least one infrared (IR) reflecting layer of a material such as silver, gold, or the like, and a dielectric overcoat designed to increase solar heat gain coefficient (SHGC) and visible transmission ($T_{vis}$) of the coated article. A dielectric undercoat of the coating may also be designed to increase SHGC and/or visible transmission of the coated article in certain example embodiments. In certain example embodiments, the overcoat and/or undercoat are designed to increase SHGC and visible transmission while also providing for substantially neutral color and/or desirably low normal emittance ($E_n$). It has surprisingly been found that overcoat and/or undercoat designs herein advantageously provide for increased SHGC and/or visible transmission ($T_{vis}$) values of the coated article, without significantly reducing normal emissivity ($E_n$) and allowing for substantially neutral color.

In certain example embodiments, a double pane IG window unit including the coating (e.g., on surface #2 or surface #3) may have an SHGC value of at least 0.60, more preferably of at least 0.65; more preferably at least 0.66; and most preferably of at least 0.67. In certain example embodiments of this invention, coated articles are able to realize a visible transmission (TY or $T_{vis}$) of at least about 68%, more preferably at least about 70%, still more preferably of at least about 72%, more preferably of at least about 74%, more preferably of at least 80% measured monolithically, and most preferably of at least 85% measured monolithically; and a normal emissivity ($E_n$) of no greater than 0.2, more preferably no greater than 0.10, and most preferably no greater than 0.045. In certain example embodiments of this invention, coated articles can realize a combination of high visible transmission ($T_{vis}$) and a high solar heat gain coefficient (SHGC) which is desired for cold climates. In view of the above, it is possible to permit the coated article, such as an IG window unit for example, to realize excellent properties such as high SHGC, high visible transmission, low emissivity, and good durability. For coatings according to example embodiments of this invention, a high SHGC is preferred because the coating is adapted for use in northern climates. The high SHGC desired for this coating is the opposite of low SHGC values desired for coatings for use in southern/hot climates.

Coated articles herein may be used in the context of insulating glass (IG) window units, or in other suitable applications such as monolithic windows, laminated windows, and/or the like.

In an example embodiment of this invention, there is provided a coated article including a coating supported by a glass substrate, the coating comprising: a first dielectric layer; an infrared (IR) reflecting layer comprising silver on the glass substrate, located over at least the first dielectric layer; a contact layer on the glass substrate located over and directly contacting the IR reflecting layer; a multilayer overcoat comprising a dielectric high index layer having a refractive index (n) of at least 2.2, a dielectric medium index layer having a refractive index (n) of from 1.9 to 2.1, and a dielectric low index layer having a refractive index of no greater than 1.7, and wherein the medium index layer is located between and directly contacting the high index layer and the low index layer; and wherein the coating has a normal emissivity ($E_n$) of no greater than 0.2, more preferably no greater than 0.10, still more preferably no greater than 0.045, and a visible transmission of at least 80% (more preferably at least 85%) measured monolithically.

In certain example embodiments of this invention, there is provided a coated article including a coating supported by a glass substrate, the coating comprising: a first dielectric layer; an infrared (IR) reflecting layer comprising silver on the glass substrate, located over at least the first dielectric layer; a contact layer on the glass substrate located over and directly contacting the IR reflecting layer; a multilayer overcoat comprising a dielectric high index layer having a refractive index (n) of at least 2.2, a dielectric medium index layer having a refractive index (n) of from 1.9 to 2.1, and a dielectric low index layer having a refractive index of no greater than 1.7, and wherein the medium index layer is located between and directly contacting the high index layer and the low index layer; a multilayer dielectric undercoat between the glass substrate and the IR reflecting layer, wherein the dielectric undercoat comprises the first dielectric layer which directly contacts the glass substrate and is a medium index layer having a refractive index (n) from 1.9 to 2.1, and a second dielectric layer which is a high index layer having a refractive index (n) of at least 2.2, and wherein in the undercoat the first dielectric layer is located between the glass substrate and the second dielectric layer; and wherein the coating has a normal emissivity ($E_n$) of no greater than 0.2.

In certain example embodiments of this invention, there is provided a coated article including a coating supported by a glass substrate, the coating comprising: a first dielectric layer; an infrared (IR) reflecting layer comprising silver on the glass substrate, located over at least the first dielectric layer; a contact layer on the glass substrate located over and directly contacting the IR reflecting layer; a multilayer overcoat comprising a dielectric high index layer comprising an oxide of bismuth and/or titanium, and a dielectric low index layer having a refractive index of no greater than 1.7, and wherein the low index layer is located between at least the high index layer and the contact layer; and wherein the coating has a normal emissivity ($E_n$) of no greater than 0.2 and/or a visible transmission of at least 80% or at least 85% measured monolithically.

DETAILED DESCRIPTION OF EXAMPLE EMBODIMENTS OF THE INVENTION

Figure 1:
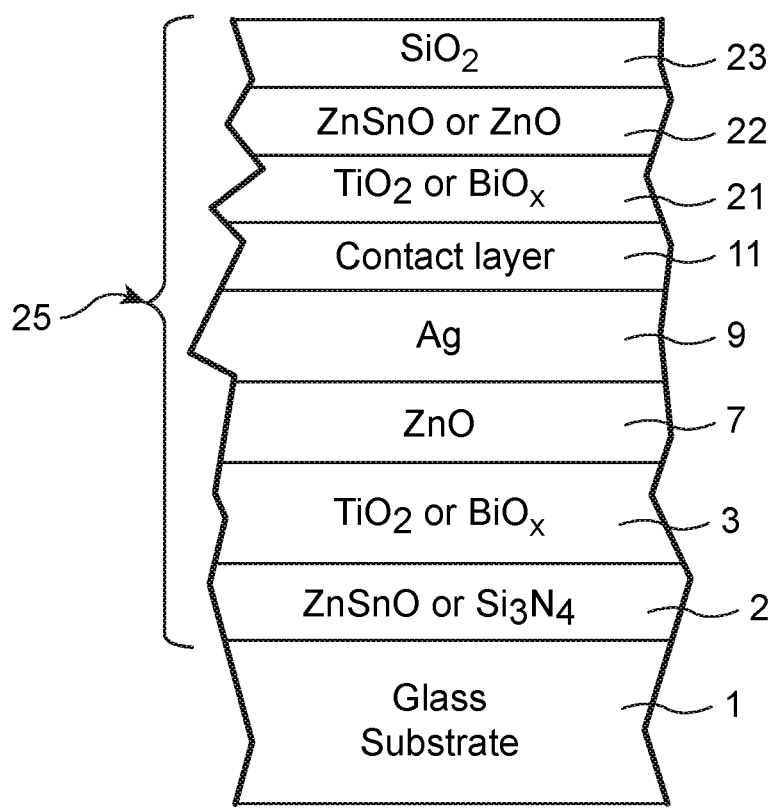
FIG. 1 is a cross sectional view of a monolithic coated article according to an example embodiment of this invention.

Referring now to the drawings in which like reference numerals indicate like parts throughout the several views.

Coated articles herein may be used in applications such as monolithic windows, IG window units such as residential windows or commercial windows, patio door windows, vehicle windows, and/or any other suitable application that includes single or multiple substrates such as glass substrates. Certain example embodiments of this invention are particularly adapted for residential window and patio door applications where high heat gain and high visible light transmission is desired.

Figure 2:
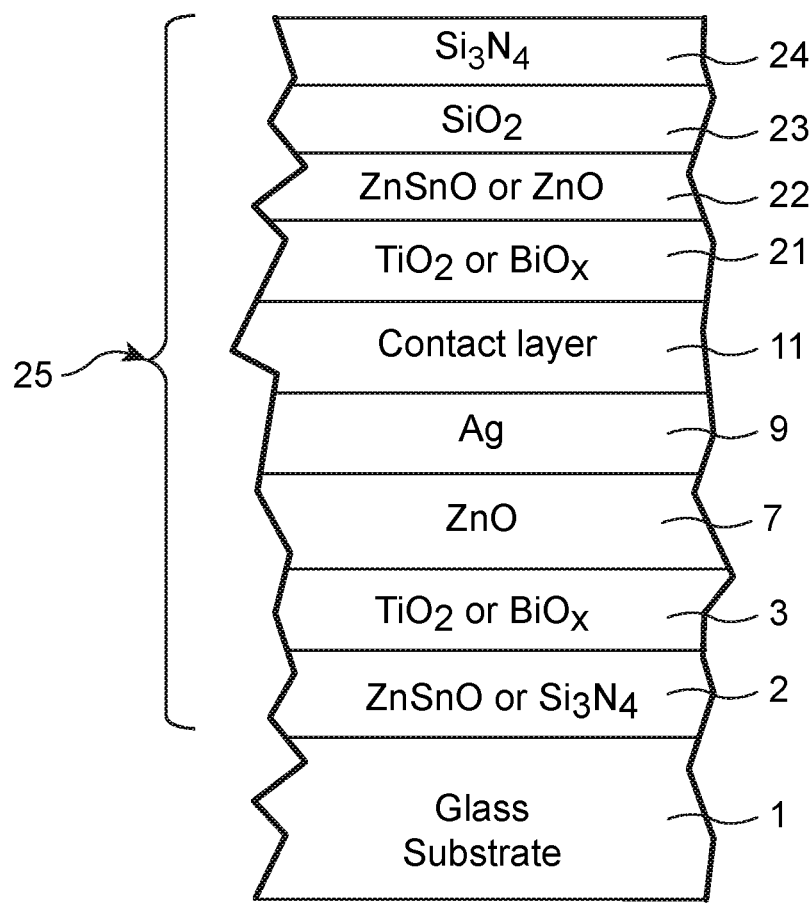
FIG. 2 is a cross sectional view of a monolithic coated article according to another example embodiment of this invention.

Referring to the FIG. 1 and FIG. 2 embodiments for example, in certain example embodiment of this invention, there is provided a coated article including a coating 25 supported by a glass substrate, the coating 25 comprising: a first dielectric layer (2, 3, or 7); an infrared (IR) reflecting layer comprising silver 9 on the glass substrate 1, located over at least the first dielectric layer (2, 3, or 7); a contact layer 11 on the glass substrate 1 located over and directly contacting the IR reflecting layer 9; a multilayer overcoat comprising a dielectric high index layer 21 having a refractive index (n) of at least 2.2 (more preferably of at least 2.25), a dielectric medium index layer 22 having a refractive index (n) of from 1.9 to 2.1 (more preferably from 1.95 to 2.06), and a dielectric low index layer 23 having a refractive index of no greater than 1.7 (more preferably no greater than 1.6), and wherein the medium index layer 22 is thinner than each of the high and low index layers 21 and 23 and is located between and directly contacting the high index layer 21 and the low index layer 23; and wherein the coating 25 has a normal emissivity ($E_n$) of no greater than 0.2, more preferably no greater than 0.10, still more preferably no greater than 0.045, and the coated article has a visible transmission of at least 80%, more preferably of at least 85% or of at least 90%, measured monolithically. In the overcoat the medium index layer 22 may be at least 50 Å thinner than each of the high index layer 21 and the low index layer 23, more preferably the medium index layer 22 may be at least 100 Å or 140 Å thinner than each of the high index layer 21 and the low index layer 23. The low index layer 23 may be of or include an oxide of silicon such as $SiO_2$. The high index layer 21 may be of or include an oxide of titanium such as $TiO_2$, or an oxide of bismuth such as $Bi_2O_3$. The medium index layer 22 may be of or include an oxide of zinc such as zinc oxide and/or zinc stannate. The overcoat may further comprise an outermost layer 24 of or including silicon nitride and/or silicon oxynitride (see FIG. 2). The coated article may have an SHGC value of at least 0.60, more preferably of at least 0.65, even more preferably of at least 0.66, and most preferably of at least 0.67, measured monolithically or in a double pane IG unit for example. The coating 25 may also include a dielectric undercoat between the glass substrate 1 and the IR reflecting layer 9, wherein the dielectric undercoat may include a first dielectric layer 2 which may be a medium index layer having a refractive index (n) from 1.9 to 2.1 (more preferably from 1.95 to 2.06) and a second dielectric layer 3 which is a high index layer having a refractive index (n) of at least 2.2 (more preferably of at least 2.25), and wherein the first dielectric layer 2 is located between, and possibly contacting, the glass substrate 1 and the second dielectric layer 3. In the undercoat, the first dielectric layer 2 may comprises zinc oxide or silicon nitride, and the second dielectric layer 3 may comprises an oxide of titanium and/or bismuth. The coating may further include a layer of or including zinc oxide and/or zinc stannate 7 located under and directly contacting the IR reflecting layer 9. The layer comprising zinc oxide and/or zinc stannate 7 may be located between and directly contacting the IR reflecting layer 9 and second dielectric layer 3 of the undercoat in certain example embodiments such as shown in FIGS. 1-4. The contact layer 11 may be of or include any suitable material such as Ni, Ti, NiCr, $NiCrO_x$, NiCrMo, NiTiNbO$_x$ or NiCrMoO$_x$. The coated article of any of FIGS. 1-4 may be provided in an IG window unit as shown in FIG. 5 for instance, and the IG unit may have a U-value of no greater than 0.30 Btu/h ft F. It has surprisingly been found that the coating is able to increase transmission and SHGC values, which are particularly desirable for coatings adapted for use in windows in cold climates, while maintaining substantially neutral color.

We found that, in order to increase visible transmission and SHGC, the undercoat can be made of two different index materials layers, first layer 2 adjacent the glass is a medium index around n=2 (such as 1.9~2.1), and the second layer 3 is a high index material such as index n=2.3 (such as 2.2~2.5), and the overcoat can be made to have a high index layer 21 (n=2.3, such as 2.2~2.5), then followed by another medium index layer 22, n around 2 (such as 1.9μ2.1), then followed another low index layer 23, such as n<1.7 or <1.6. In such design, it was found that the solar gain was greatly enhanced as was visible transmission in a surprising and unexpected manner.

FIG. 1 is a cross sectional view of a coated article according to an example embodiment of this invention. The coated article includes glass substrate 1 (e.g., clear, green, bronze, or blue-green glass substrate from about 1.0 to 10.0 mm thick, more preferably from about 1.0 mm to 6.0 mm thick), and a multi-layer coating (or layer system) 25 provided on the substrate 1 either directly or indirectly. As shown in FIG. 1, the coating 25 is of or includes medium index dielectric layer 2 of or including silicon nitride (e.g., Si$_3$N$_4$, or some other suitable stoichiometry), zinc oxide, zinc stannate, or the like, dielectric layer 3 of or including a high index metal oxide such as an oxide of titanium (e.g., TiO$_x$ where "x" is from 1 to 2, more preferably about 2), an oxide of bismuth, or an oxide of niobium, zinc oxide inclusive contact layer 7 (e.g., ZnO$_x$ where "x" may be about 1; or ZnAlO$_x$ or zinc stannate), IR (infrared) reflecting layer 9 including or of silver, gold, or the like, upper contact layer 11 of or including any suitable material such as Ni, Ti, NiCr, an oxide of Ni and/or Cr (e.g., NiCrO$_x$), NiCrMo, NiTiNbO$_x$ or NiCrMoO$_x$, and a transparent dielectric overcoat of or including high index layer 21 of or including a high index material such as bismuth oxide, titanium oxide (e.g., TiO$_2$), or niobium oxide, medium index layer 22 of a material such as zinc oxide, tin oxide, or zinc stannate, and low index layer 23 of a low index material such as silicon oxide (e.g., SiO$_2$). Of course, any silicon nitride inclusive layers 15 may further include Al, oxygen, or the like, and other layers may be doped with other materials. Other layers and/or materials may also be provided in the coating 25 in certain example embodiments of this invention, and it is also possible that certain layers may be removed or split in certain example instances. Moreover, one or more of the layers discussed above may be doped with other materials in certain example embodiments of this invention. All layers may be formed by sputter deposition in certain example embodiments of this invention.

High index layers dielectric layers 3 and 21 are preferably of or including a high index metal oxide such as an oxide of titanium (e.g., TiO$_x$ where "x" is from 1 to 2, more preferably about 2), an oxide of bismuth, or an oxide of niobium. However, other element(s) may be added to these layers. For example one or both of high index dielectric layers 3 and/or 21 may be of or include high index material such as TiZrO$_x$, YTiO$_x$, TiSnO$_x$, TiZnSnO$_x$, TiNbO$_x$, or the like. The addition of Zr, Y, Sn, or Nb for example to the titanium oxide is advantageous, for example, in that it results in a difference in atomic radii of Ti and the other metal(s) which causes a disruption in lattice formation and hence impedes the formation of crystals, thereby resulting in a coating that is more thermally stable upon heat treatment such as thermal tempering.

High index layer(s) 3 and/or 21 may also be formed of or including NbBiO$_x$. In such embodiments, metal content of the NbBiO$_x$ inclusive high index layer may be from 55-99% Nb, more preferably from 60-95% Nb, still more preferably from 70-90% Nb, and from 1-45% Bi, more preferably from 5-40% Bi, still more preferably from 10-30% Bi (atomic %).

FIG. 2 is a cross sectional view of a coated article according to another example embodiment of this invention. The FIG. 2 embodiment is the same as the FIG. 1 embodiment described above, except that the overcoat in the FIG. 2 embodiment also includes an outermost layer 24 of or including silicon nitride and/or silicon oxynitride that may be located over and directly contacting the low index layer 23. The outermost layer 24 of or including silicon nitride and/or silicon oxynitride may have a thickness of from 50-200 Å, more preferably from 75-150 Å, and most preferably from 80-120 Å. This layer 24 is preferably thin and is provided in order to improve durability of the coating.

Figure 3:
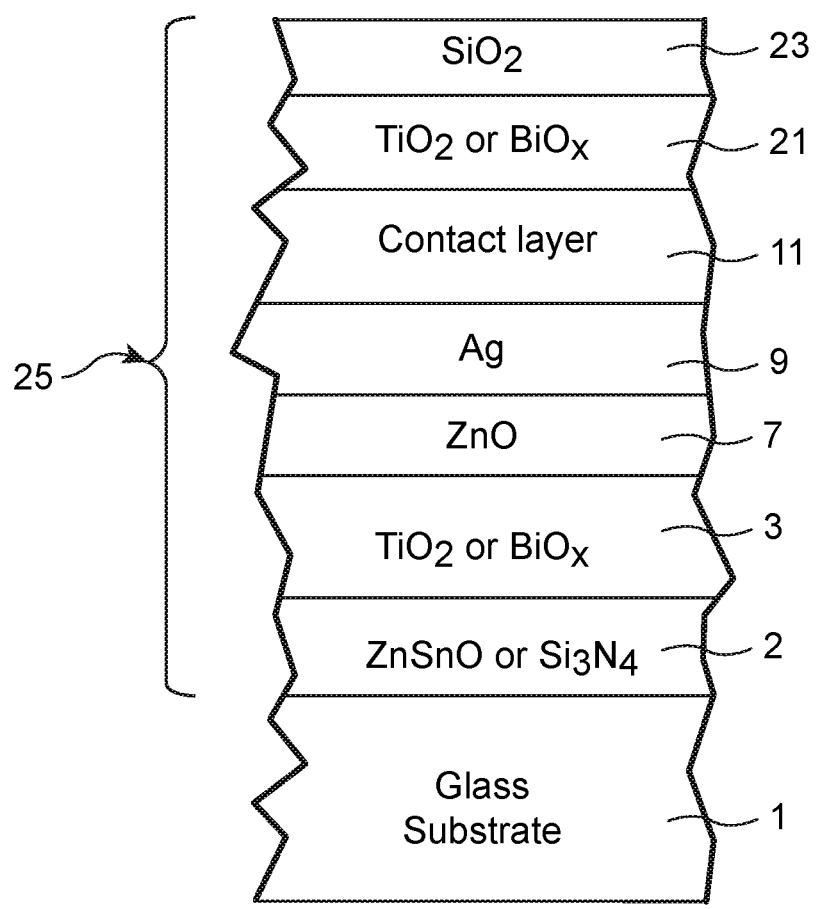
FIG. 3 is a cross sectional view of a monolithic coated article according to another example embodiment of this invention.

FIG. 3 is a cross sectional view of a coated article according to another example embodiment of this invention. The FIG. 3 embodiment is the same as the FIG. 1 embodiment described above, except that in the FIG. 3 embodiment medium index layer 22 is omitted.

Figure 4:
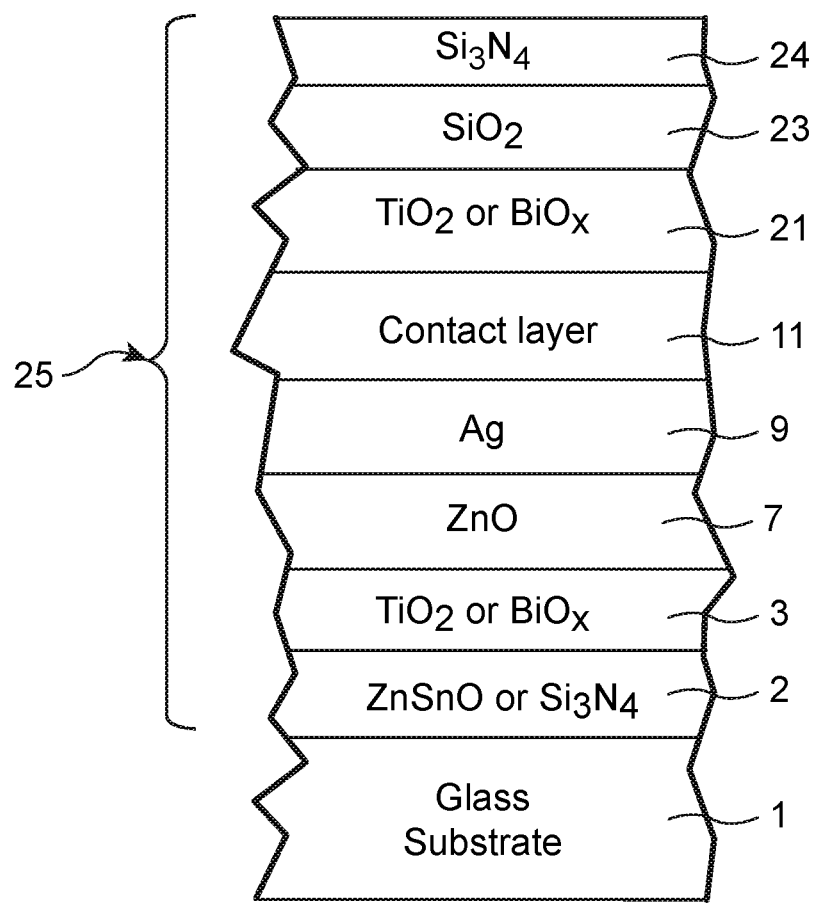
FIG. 4 is a cross sectional view of a monolithic coated article according to another example embodiment of this invention.
Figure 5:
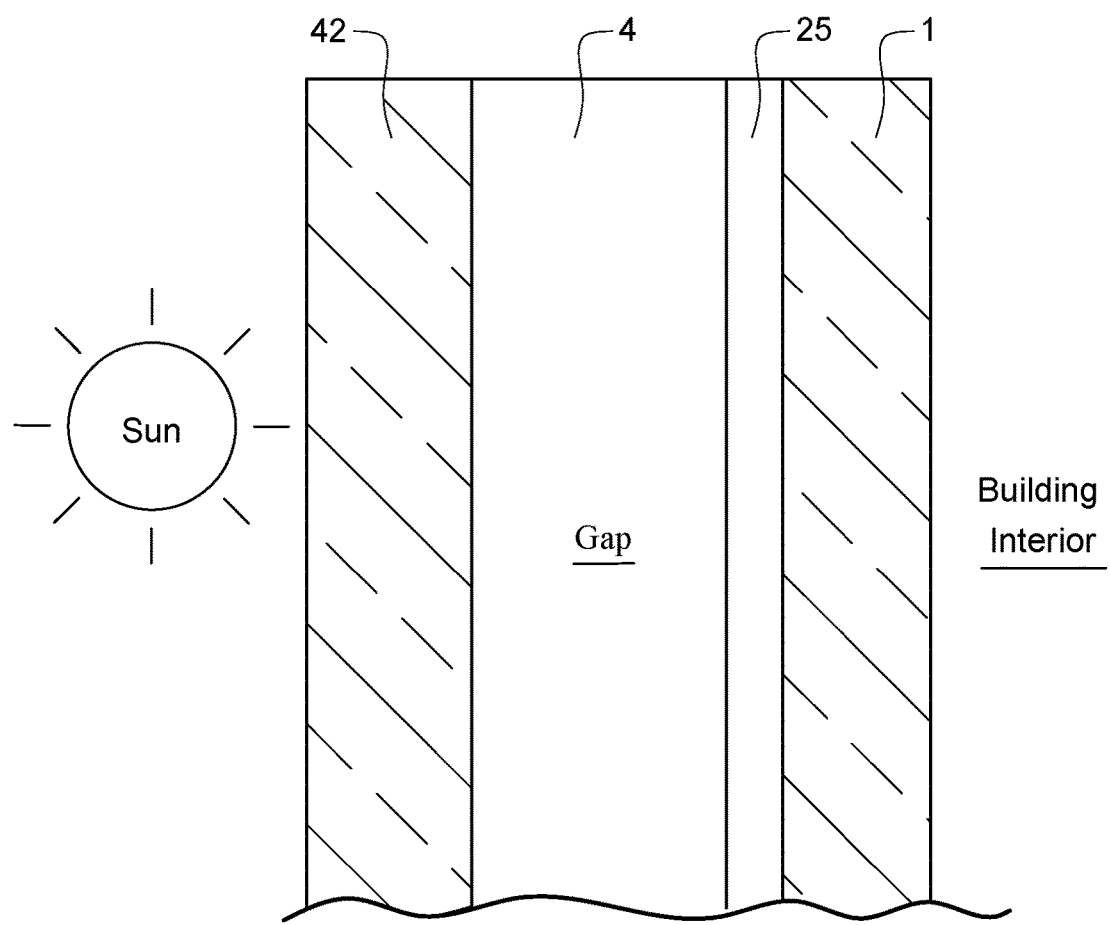
FIG. 5 is a cross sectional view of part of an insulating glass (IG) window unit including the coated article of any of FIGS. 1-4 according to an example embodiment of this invention.

FIG. 4 is a cross sectional view of a coated article according to another example embodiment of this invention. The FIG. 4 embodiment is the same as the FIG. 2 embodiment described above, except that in the FIG. 4 embodiment medium index layer 22 is omitted.

In monolithic instances, the coated article includes only one substrate such as glass substrate 1 (see FIGS. 1-4). However, monolithic coated articles herein may be used in devices such as IG window units for example. Typically, as shown in FIG. 5, an IG window unit may include two spaced apart substrates 1 and 42, with an air gap 4 defined therebetween. Example IG window units are illustrated and described, for example, in U.S. Pat. Nos. 5,770,321, 5,800, 933, 6,524,714, 6,541,084 and US 2003/0150711, the disclosures of which are all hereby incorporated herein by reference. An example IG window unit as shown in FIG. 5 may include, for example, the coated glass substrate 1 shown in any of FIGS. 1-4 coupled to another glass substrate 42 via spacer(s), sealant(s) or the like with a gap 4 being defined therebetween. This gap 4 between the substrates in IG unit embodiments may in certain instances be filled with a gas such as argon (Ar). An example IG unit may comprise a pair of spaced apart substantially clear glass substrates each about 3-4 mm thick one of which is coated with a coating 25 herein in certain example instances, where the gap 4 between the substrates may be from about 5 to 30 mm, more preferably from about 10 to 20 mm, and most preferably about 12-16 mm. In certain example instances, the coating 25 may be provided on the side of the inner glass substrate 1 facing the gap, i.e., surface #3 (although the coating may be on the other substrate 42 in certain alternative embodiments). In other example embodiments, the IG window unit may include additional glass sheets (e.g., the IG unit may include three spaced apart glass sheets instead of two).

Other layer(s) below or above the illustrated coatings 25 of FIGS. 1-4 may also be provided. Thus, while the layer system or coating is "on" or "supported by" substrate 1 (directly or indirectly), other layer(s) may be provided therebetween. Thus, for example, the coating of FIG. 1 may be considered "on" and "supported by" the substrate 1 even if other layer(s) are provided between layer 2 and substrate 1. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention.

While various thicknesses may be used in different embodiments of this invention, example thicknesses and materials for the respective layers on the glass substrate 1 in the FIG. 1-4 embodiments are as follows, from the glass substrate outwardly (e.g., the Al content in the zinc oxide layers and the silicon nitride layers may be from about 1-10%, more preferably from about 1-3% in certain example instances):

TABLE 1

(Example Materials/Thicknesses; FIG. 1-4 Embodiments)

| Layer | Preferred Range (Å) | More Preferred (Å) | Example (Å) |
|---|---|---|---|
| $Si_xN_y$ or ZnSnO (layer 2) | 20-400 Å | 50-200 Å | 80 Å |
| $TiO_x$ or $BiO_x$ (layer 3) | 30-300 Å | 50-300 Å | 240 Å |
| $ZnAlO_x$ (layer 7) | 10-230 Å | 30-120 Å | 40 Å |
| Ag (layer 9) | 60-160 Å | 80-140 Å | 107 Å |
| contact (layer 11) | 10-60 Å | 20-40 Å | 26 Å |
| $TiO_x$ or $BiO_x$ (layer 21) | 80-400 Å | 160-250 Å | 190 Å |
| ZnO or ZnSnO (layer 22) | 20-140 Å | 30-80 Å | 40 Å |
| $SiO_2$ (layer 23) | 50-700 Å | 150-600 Å | 500 Å |
| $Si_xN_y$ (layer 24) | 50-200 Å | 80-120 Å | 100 Å |

In certain example embodiments of this invention, coated articles herein (e.g., see FIGS. 1-4) may have the following low-E (low emissivity), solar and/or optical characteristics set forth in Table 2 when measured monolithically, absent any heat treatment (thermal tempering).

TABLE 2

Low-E/Solar Characteristics (Monolithic; non-HT)

| Characteristic | General | More Preferred | Most Preferred |
|---|---|---|---|
| Rs (ohms/sq.): | <= 11.0 | <= 10 | <= 9 |
| $E_n$: | <= 0.2 | <= 0.10 | <= 0.045 |
| $T_{vis}$ (%): | >= 80 | >= 85 | >= 90 |

EXAMPLES

The following examples are provided for purposes of example only, and are not intended to be limiting. The listed thicknesses are approximations and are in units of nm. Refractive index (n) values herein are at 550 nm. Below modeled are a Comparative Example (CE) 1, Example 1 according to the FIG. 3 embodiment, and Example 2 according to the FIG. 1 embodiment.

TABLE 3

Layer Stacks for CE 1 and Examples 1-2

| Material | n @ 550 nm Index value | Comparative Example 1 Experiment | Ex. 1 | Ex. 2 |
|---|---|---|---|---|
| $SiO_2$ | 1.5 | 0 | 46 | 50 |
| ZnSnO | 2 | 0 | 0 | 4 |

TABLE 3-continued

Layer Stacks for CE 1 and Examples 1-2

| Material | n @ 550 nm Index value | Comparative Example 1 Experiment | Ex. 1 | Ex. 2 |
|---|---|---|---|---|
| ZnAlO | 2 | 36.5 | 0 | 0 |
| $TiO_2$ | 2.3 | 6 | 20 | 19 |
| $NiTiNbO_x$ | 2.3 | 2.6 | 2.6 | 2.6 |
| Ag | 0.1 | 11 | 10.7 | 10.7 |
| ZnAlO | 2 | 4 | 4 | 4 |
| $TiO_2$ | 2.3 | 31.4 | 33.6 | 24 |
| ZnSnO | 2 | | | 8 |
| glass (4 mm) | 1.5 | | | |

Optical data for Comparative Example (CE) 1 and Examples 1-2 are as follows. Note that Y refers to visible transmission, that SHGC(2) refers to SHGC when the coating is on surface #2 of a double pane IG unit, that SHGC(3) refers to SHGC when the coating is on surface #3 of a double pane IG unit.

TABLE 4

Optical Data for CE 1 and Examples 1-2.

| | | | CE 1 | Ex. 1 | Ex. 2 |
|---|---|---|---|---|---|
| Monolithic Optics (Ill 'C', 2 deg obs) | T | Y (%) | 89.7 | 89.9 | 90.2 |
| | | a* | -1.47 | -1.38 | -1.44 |
| | | b* | 1.89 | 1.09 | 0.95 |
| | Rg | Y (%) | 5.2 | 5.5 | 6.1 |
| | | a* | 2.28 | 1.95 | 2.36 |
| | | b* | -8.42 | -6.06 | -5.75 |
| | Rf | Y (%) | 4.4 | 4.4 | 5.1 |
| | | a* | 2.81 | 2.31 | 2.9 |
| | | b* | -7.28 | -7.06 | -8.7 |
| | A[vis] (100-TT-Rf) | | 5.9 | 5.7 | 4.7 |
| IG Optics (Ill 'C', 2 deg obs) | T | Y(%) | 81.9 | 82.1 | 82.4 |
| | | a* | -1.93 | -1.85 | -1.89 |
| | | b* | 2.09 | 1.32 | 1.15 |
| | Rg | Y (%) | 11.9 | 12.1 | 12.8 |
| | | a* | 0.36 | 0.24 | 0.54 |
| | | b* | -4.48 | -3.43 | -3.43 |
| | Rf | Y(%) | 11.8 | 11.9 | 12.5 |
| | | a* | 0.84 | 0.62 | 0.96 |
| | | b* | -3.53 | -3.43 | -4.47 |
| Normal Emissivity ($E_n$) | | | 0.0356 | 0.0390 | 0.0390 |
| Double glazing EN 410-673 Thermal Performance | Tvis (%) | | 0.819 | 0.821 | 0.824 |
| | Tsol (%) | | 0.585 | 0.606 | 0.616 |
| | SHGC(3) | | 0.653 | 0.676 | 0.68 |
| | SHGC(2) | | 0.607 | 0.63 | 0.64 |
| | Uval | | 1.153 | 1.164 | 1.165 |
| | LSG(3) | | 1.25 | 1.21 | 1.21 |
| | LSG(2) | | 1.35 | 1.3 | 1.29 |
| Triple glazing IG Optics (Ill 'C', 2 deg obs) | T | Y (%) | 73.9 | 74.2 | 74.8 |
| | | a* | -3.14 | -3.02 | -3.09 |
| | | b* | 3.59 | 2.12 | 1.76 |
| | Rg | Y (%) | 14.8 | 15.1 | 16.3 |
| | | a* | 0.61 | 0.42 | 0.85 |
| | | b* | -5.5 | -4.74 | -5.42 |
| | Rf | Y (%) | 14.8 | 15.1 | 16.3 |
| | | a* | 0.61 | 0.42 | 0.85 |
| | | b* | -5.5 | -4.74 | -5.42 |
| Triple glazing EN 410-673 Thermal Performance | Tvis (%) | | 0.739 | 0.742 | 0.749 |
| | Tsol (%) | | 0.465 | 0.491 | 0.502 |
| | SHGC(25) | | 0.529 | 0.554 | 0.563 |
| | SHGC(52) | | 0.529 | 0.554 | 0.563 |
| | Uval | | 0.592 | 0.6 | 0.6 |
| | LSG(3) | | 1.4 | 1.34 | 1.33 |
| | LSG(2) | | 1.4 | 1.34 | 1.33 |

It can be seen from the data above that the overcoats provided in Examples 1 and 2 surprisingly and unexpectedly increased both visible transmission (Y or $T_{vis}$) and SHGC values of the coated articles, compared to Comparative Example (CE) 1, while maintaining substantially neutral color and low emissivity.

Example 3 according to the FIG. 4 embodiment was modeled, and was the same as Example 2 except that the $SiO_2$ layer 23 was 25 nm thick and a silicon nitride layer 24 was provided at a thickness of 10 nm. Example 3 also increased visible transmission and SHGC compared to CE 1 in an unexpected manner.

In an example embodiment of this invention, there is provided a coated article including a coating supported by a glass substrate, the coating comprising: a first dielectric layer; an infrared (IR) reflecting layer comprising silver on the glass substrate, located over at least the first dielectric layer; a contact layer on the glass substrate located over and directly contacting the IR reflecting layer; a multilayer overcoat comprising a dielectric high index layer having a refractive index (n) of at least 2.2, a dielectric medium index layer having a refractive index (n) of from 1.9 to 2.1, and a dielectric low index layer having a refractive index of no greater than 1.7, and wherein the medium index layer is thinner than each of the high and low index layers and is located between and directly contacting the high index layer and the low index layer; and wherein the coating has a normal emissivity ($E_n$) of no greater than 0.2, more preferably no greater than 0.10, still more preferably no greater than 0.045, and the coated article has a visible transmission of at least 80%, more preferably of at least 85%, measured monolithically.

In the coated article of the immediately preceding paragraph, the low index layer may comprise an oxide of silicon such as $SiO_2$.

In the coated article of any of the preceding two paragraphs, the high index layer may comprise an oxide of titanium such as $TiO_2$, or an oxide of bismuth.

In the coated article of any of the preceding three paragraphs, the medium index layer may comprise an oxide of zinc such as zinc oxide and/or zinc stannate.

In the coated article of any of the preceding four paragraphs, the overcoat may further comprise an outermost layer comprising silicon nitride and/or silicon oxynitride that is located over and directly contacting the low index layer, wherein the outermost layer comprising silicon nitride and/or silicon oxynitride may have a thickness of from 50-200 Å, more preferably from 75-150 Å, and most preferably from 80-120 Å. Note that all thicknesses discussed herein are physical thicknesses.

In the coated article of any of the preceding five paragraphs, the high index layer may comprise an oxide of titanium and/or bismuth, the medium index layer may comprises an oxide of zinc, and the low index layer may comprise an oxide of silicon.

In the coated article of any of the preceding six paragraphs, the coated article may have, measured monolithically, a visible transmission of at least 85%, more preferably of at least 90%.

In the coated article of any of the preceding seven paragraphs, the coated article may have an SHGC value of at least 0.60, more preferably of at least 0.65, even more preferably of at least 0.66, and most preferably of at least 0.67.

In the coated article of any of the preceding eight paragraphs, the coating may further comprise a dielectric undercoat between the glass substrate and the IR reflecting layer, wherein the dielectric undercoat may comprise the first dielectric layer which may be a medium index layer having a refractive index (n) from 1.9 to 2.1 (more preferably from 1.95 to 2.06) and a second dielectric layer which is a high index layer having a refractive index (n) of at least 2.2 (more preferably of at least 2.25), and wherein the first dielectric layer is located between, and possibly contacting, the glass substrate and the second dielectric layer. In the undercoat, the first dielectric layer may comprises zinc oxide or silicon nitride, and the second dielectric layer may comprises an oxide of titanium and/or bismuth.

In the coated article of any of the preceding nine paragraphs, the coating may further comprise a layer comprising zinc oxide and/or zinc stannate located under and directly contacting the IR reflecting layer. The layer comprising zinc oxide and/or zinc stannate may be located between and directly contacting the IR reflecting layer and second dielectric layer of the undercoat.

In the coated article of any of the preceding ten paragraphs, the contact layer may comprises Ni and/or Cr, and may be of for example NiCr, $NiCrO_x$, $NiTiNbO_x$, or $NiCrMoO_x$.

In the coated article of any of the preceding eleven paragraphs, the coating in certain example embodiments may contain no more than one IR reflecting layer comprising silver. However, in other embodiments, a second IR reflecting layer of or including silver may be located between at least the glass substrate and the first recited IR reflecting layer.

An IG window unit may include the coated article of any of the preceding twelve paragraphs. The IG unit may have a U-value of no greater than 0.30 Btu/h ft F.

In the coated article of any of the preceding thirteen paragraphs, in the overcoat the medium index layer may be at least 50 Å thinner than each of the high index layer and the low index layer, more preferably the medium index layer may be at least 100 Å or 140 Å thinner than each of the high index layer and the low index layer.

In the coated article of any of the preceding fourteen paragraphs, the high index layer(s) may be of or include any of $TiO_x$, $TiZrO_x$, $YTiO_x$, $TiSnO_x$, $TiZnSnO_x$, or $TiNbO_x$.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A coated article including a coating supported by a glass substrate, the coating comprising:
   a first dielectric layer;
   an infrared (IR) reflecting layer comprising silver on the glass substrate, located over at least the first dielectric layer;
   a contact layer on the glass substrate located over and directly contacting the IR reflecting layer;
   a multilayer overcoat comprising a dielectric high index layer having a refractive index (n) of at least 2.2, a dielectric medium index layer having a refractive index (n) of from 1.9 to 2.1, and a dielectric low index layer having a refractive index of no greater than 1.7, and wherein the medium index layer is thinner than each of the high and low index layers and is located between and directly contacting the high index layer and the low index layer, and wherein the high index layer comprises an oxide of Bi and Nb, and contains more Nb than Bi; and wherein the coating has a normal emissivity ($E_n$) of no greater than 0.2.

2. The coated article of claim 1, wherein the low index layer comprises an oxide of silicon.

3. The coated article of claim 1, wherein the overcoat further comprises an outermost layer comprising silicon nitride and/or silicon oxynitride that is located over and directly contacting the low index layer, wherein the outermost layer comprising silicon nitride and/or silicon oxynitride has a thickness of from 50-200 Å.

4. The coated article of claim 1, wherein the medium index layer comprises an oxide of zinc, and the low index layer comprises an oxide of silicon.

5. The coated article of claim 1, wherein the coated article has an SHGC value of at least 0.60.

6. The coated article of claim 1, wherein the coated article has an SHGC value of at least 0.66.

7. The coated article of claim 1, wherein the coating further comprises a dielectric undercoat between the glass substrate and the IR reflecting layer, wherein the dielectric undercoat comprises the first dielectric layer which is a medium index layer having a refractive index (n) from 1.9 to 2.1 and a second dielectric layer which is a high index layer having a refractive index (n) of at least 2.2, and wherein the first dielectric layer is located between the glass substrate and the second dielectric layer.

8. A coated article including a coating supported by a glass substrate, the coating comprising:
a first dielectric layer;
an infrared (IR) reflecting layer comprising silver on the glass substrate, located over at least the first dielectric layer;
a contact layer on the glass substrate located over and directly contacting the IR reflecting layer;
a multilayer overcoat comprising a dielectric high index layer having a refractive index (n) of at least 2.2, a dielectric medium index layer having a refractive index (n) of from 1.9 to 2.1, and a dielectric low index layer having a refractive index of no greater than 1.7, and wherein the medium index layer is located between the high index layer and the low index layer, and wherein the high index layer comprises an oxide of Bi and Nb, and contains more Nb than Bi;
a multilayer dielectric undercoat between the glass substrate and the IR reflecting layer, wherein the dielectric undercoat comprises the first dielectric layer which directly contacts the glass substrate and is a medium index layer having a refractive index (n) from 1.9 to 2.1, and a second dielectric layer which is a high index layer having a refractive index (n) of at least 2.2, and wherein in the undercoat the first dielectric layer is located between the glass substrate and the second dielectric layer; and
wherein the coating has a normal emissivity ($E_n$) of no greater than 0.2.

9. A coated article including a coating supported by a glass substrate, the coating comprising:
a first dielectric layer;
an infrared (IR) reflecting layer comprising silver on the glass substrate, located over at least the first dielectric layer;
a contact layer on the glass substrate located over and directly contacting the IR reflecting layer;
a multilayer overcoat comprising a dielectric high index layer comprising an oxide of bismuth, and a dielectric low index layer having a refractive index of no greater than 1.7, and wherein the low index layer is located between at least the high index layer comprising the oxide of bismuth and the contact layer, and wherein the high index layer comprises an oxide of Bi and Nb, and contains more Nb than Bi; and
wherein the coating has a normal emissivity ($E_n$) of no greater than 0.2 and a visible transmission of at least 80% measured monolithically.

* * * * *